United States Patent [19]

Gutweiler et al.

[11] Patent Number: 5,019,624

[45] Date of Patent: May 28, 1991

[54] NEW POLYVINYL ACETALS AND THEIR USE

[75] Inventors: Matthias Gutweiler, Taunusstein; Robert K. Driscoll, Frankfurt am Main; Ernst I. Leupold, Neu-Anspach, all of Fed. Rep. of Germany

[73] Assignee: Hoechst AG, Fed. Rep. of Germany

[21] Appl. No.: 512,992

[22] Filed: Apr. 23, 1990

[30] Foreign Application Priority Data

Apr. 25, 1989 [DE] Fed. Rep. of Germany ....... 3913572

[51] Int. Cl.$^5$ .............................................. C08F 8/00
[52] U.S. Cl. ...................................... 525/61; 524/557
[58] Field of Search ........................... 525/61; 524/557

[56] References Cited

FOREIGN PATENT DOCUMENTS 0810259  3/1959  United Kingdom ................. 525/62

*Primary Examiner*—Joseph L. Schofer
*Assistant Examiner*—J. M. Reddick

*Attorney, Agent, or Firm*—Bierman and Muserlian

[57] ABSTRACT

Acetals of polyvinyl alcohol are described in which at least some of the acetal groups are derived from terminally etherified oxyethylene aldehydes/oxaalkanals of the formula

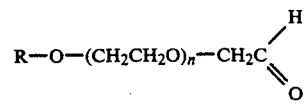

The new acetals are internally plasticized and can be processed thermoplastically without external plasticizers. Depending on the nature of the radical R, which can be aliphatic, cycloaliphatic or aromatic, and the size of n, an integer, preferably 1 to 3, and, on the nature of other aldehydes which may be co-used for mixed acetalation, the new acetals are soluble in water or organic solvents.

9 Claims, No Drawings

POLYVINYL ACETALS AND THEIR USE

DESCRIPTION

The invention relates to new polyvinyl acetals which are obtainable by acetalation of polyvinyl alcohols with terminally etherified oxyethylene aldehydes/oxaalkanals of the formula (I)

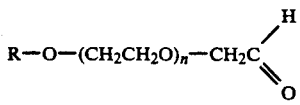  (I)

In this formula R is a straight-chain or branched alkyl radical or a cycloalkyl radical or an aryl radical, and n is an integer. Aldehydes of this type are accessible from addition products of ethylene oxide onto hydroxy compounds R—OH and conversion of the terminal OH group into a

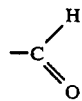

group by known methods, for example by catalytic oxidative dehydrogenation according to German Laid Open application 3,701,304.

Polyvinyl acetals, particularly polyvinyl butyrals, are used as binders for primer coating compositions and coating compositions, as adhesives and coating agents, but especially in the form of films for the preparation of laminated glass.

Because of the high melting point and the low flow ability, even at high temperature, of polyvinyl butyrals, these materials can be processed thermoplastically only after addition of external plasticizers, for example of phthalic acid esters of alcohols having 6 to 10 carbon atoms, triethylene glycol di-n-heptanoate, tri-2-ethylhexyl) phosphate and tricresyl phosphate. Since these plasticizers frequently have only limited miscibility or compatibility with polyvinyl butyrals, they can separate out from the polymer, and even compatible plasticizers can be extracted from the mixture, for example on contact with solvents. Considerable changes in the properties of the product result in both cases.

Therefore, attempts have already been made to plasticize polyvinyl acetals internally. According to U.S. Pat. Nos. 2,356,479 and 2,459,488, this can be achieved in principle by acetalation with alkoxyacetaldehydes, but only at a very high degree of acetalation, at which the content of free vinyl alcohol units naturally becomes low. As a result of this, for example, films made from such acetals do not exhibit high strengths and the adhesion to certain substrates, in particular to glass, declines.

The aim of the present invention was to make available internally plasticized polyvinyl acetals which have a high content of vinyl alcohol units, and can be processed thermoplastically without addition of external plasticizers. A further aim was to make available polyvinyl acetals which, coupled with good thermoplastic processibility, cover a wide field of application and are, for example, soluble in cold water or in organic solvents.

This aim is achieved according to the invention with polyvinyl acetals in which at least some acetal groups are derived from aldehydes of the formula (I)

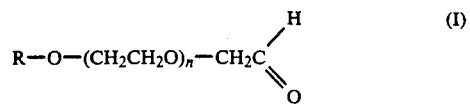  (I)

These aldehydes are terminally etherified oligoethylene oxide aldehydes. In the formula R is a straight-chain or branched alkyl radical having 1 to 20 carbon atoms, a cycloalkyl radical, a benzyl radical or a phenyl radical and n is an integer, at least 1. Preferred aldehydes are those in which R is a linear alkyl radical, in particular one having 1 to 4 carbon atoms, and n is an integer from 1 to 3, in particular 2.

Polyvinyl alcohols, from which the new acetals are prepared, have molecular weights between about 2,000 and about 250,000. Polyvinyl alcohols having molecular weights of about 10,000 to about 100,000 are preferred. They can be partially or completely saponified, completely saponified types being given preference. In this context polyvinyl alcohols deemed to be completely saponified are those in which between 98 and 100% of the original vinyl ester units have been saponified to vinyl alcohol units.

In addition to acetal groups which are derived from aldehydes of the formula (I), the polyvinyl acetals according to the invention can also contain other acetal groups, which are derived from aliphatic, cycloaliphatic or aromatic aldehydes, for example formaldehyde, acetaldehyde, propionaldehyde, butyraldehyde, isononane aldehyde or benzaldehyde, preferably from butyraldehyde. By means of the co-use of such aldehydes or aldehyde mixtures, it is possible, for example, to influence the solubility properties of the new acetals.

In total the acetalation of the polyvinyl alcohol should not involve more than 85 mol-%, in particular 80 to 30 mol-% and preferably 75 to 45 mol-%, of the vinyl alcohol units originally present (=100 mol-%).

The properties of the polyvinyl acetals, in particular solubilities and glass transition temperatures, are determined by the aldehyde used and the degree of acetalation. Thus, for the same degree of acetalation, the introduction for a further ethylene oxide group into the terminally etherified oligoethylene oxide aldehydes leads to a significantly higher degree of internal plasticizing of the polymer. This manifests itself as a reduction in the glass transition temperature. Likewise, for the same aldehyde, a higher degree of internal plasticizing is achieved by a higher degree of acetalation. The solubility of the polyvinyl acetals is influenced by the length of the terminal alkyl chain of the aldehydes used for the acetalation as well as by the degree of acetalation. Thus, for example, for a residual polyvinyl alcohol content of 45 mol-%, the polyvinyl acetals of the aldehydes having a terminal methyl group are soluble in cold water, whilst the corresponding polyvinyl acetals of the aldehydes having a terminal butyl group are insoluble in water.

The solubility of the corresponding polyvinyl acetals in water can also influenced by co-acetalation with aliphatic or aromatic aldehydes, in particular butyraldehyde.

The preparation of the new polyvinyl acetals is carried out by methods known per se, in an aqueous, aqueous/organic or organic medium, but preferably in an aqueous medium in the presence of acid catalysts such as hydrochloric acid, sulfuric acid, phosphoric acid or p-toluenesulfonic acid. In these procedures the catalyst can be gradually added to an aqueous solution of polyvinyl alcohol containing the aldehyde, or the aldehyde can be added to a solution of polyvinyl alcohol containing the catalyst, or the process can be carried out as a one-pot process.

In the case of acetalation in aqueous media, the co-use of emulsifiers can have an advantageous effect on the course of acetalation. Particularly suitable emulsifiers are preferably anionic emulsifiers from the group comprising ($C_8$–$C_{20}$)-alkanesulfonic acids, fluorinated fatty acids or fluorinated long chain sulfonic acids, long chain alkylsulfosuccinates, and mixtures of these emulsifiers.

If the polyvinyl acetal to be prepared is water-soluble, the acetalation can be carried out at elevated temperature, for example up to about 50° C. If the polyvinyl acetal to be prepared is water-insoluble, the aqueous solution of polyvinyl alcohol and catalyst is cooled to a temperature of not more than 15° C. before adding the aldehyde.

To prepare the water-insoluble polyvinyl acetals according to the invention in an aqueous medium, using known methods, preferably 1 to 50% by weight, in particular 5 to 20% by weight, aqueous solutions of polyvinyl alcohol, preferably prepared at above room temperature, are added to the acid catalyst, the solutions are then cooled to temperatures of <15° C. and the acetalation reaction is carried out by metering in the aldehyde, preferably over a period of 5 to 300 minutes, with vigorous stirring. The acetalation reaction can also be carried out as a batch reaction, if appropriate.

The amount of the aldehyde to be added depends on the desired degree of acetalation and on the stoichiometric requirement that can be calculated from this. Because, as is known, the conversion of aldehyde is usually incomplete, the process is preferably carried out using an excess aldehyde. The aldehyde is particularly preferentially used in an excess of up to 80 mol-%, in particular 10 to 20 mol-%. In a particularly preferred process variant the acetalation in the aqueous polyvinyl alcohol/acid catalyst starting solution is initiated at temperatures of 5° C. to 10° C., after which the polyvinyl acetal formed separates out directly, usually in the form of a powder. To complete the reaction the reaction mixture is slowly warmed to room temperature and if necessary this is followed by a post-reaction of about 1 to 3 hours at higher temperatures, for example at 25° C. to 70° C. Where appropriate, the reaction is carried out using an addition of emulsifier, it being possible to add the emulsifier, preferably a surface-active sulfonic acid, either to the starting solution, or during the course of the reaction and/or during the post-reaction. The amount of acid catalyst to be used depends, inter alia, on the desired degree of acetalation and can preferably be up to 1.1 equivalents, relative to the molar content of vinyl alcohol units.

The water-insoluble polyvinyl acetal formed, which preferably precipitates in powder form from the aqueous reaction solution, is filtered off from the liquid phase with suction, washed with water adjusted to a weakly alkaline pH (pH 9 to pH 12) and dried.

The water-soluble polyvinyl acetals according to the invention are likewise prepared in water by the processes already described. The isolation of the polymer from the aqueous solution is carried out after prior neutralization of the solution, preferably by addition of a suitable precipitating agents. Suitable agents are, for example, various inorganic salts, such as, for example, sodium chloride, potassium chloride, sodium sulfate, magnesium chloride, and the like. Furthermore, water-miscible solvents, such as, for example, water-soluble alcohols, preferably ethanol and/or methanol, and other organic solvents, preferably tetrahydrofuran and/or dioxane, can be used for precipitation. Alternatively the polymer can be isolated by freeze-drying after prior dialysis.

In principle, the preparation of all polyvinyl acetals according to the invention can also be carried in organic solvents. With the polyvinyl alcohols which are not soluble in organic solvents, the process can be carried as a two- or multiple-phase reaction. A single phase reaction can also be achieved by adding water to water-soluble or water-dilutable solvents.

Suitable solvents are, for example, xylenes, toluene, chloroform and methylene chloride, but especially water-miscible solvents, in particular water-soluble alcohols, preferably ethanol and/or methanol.

To prepare the polyvinyl acetals according to the invention in organic solvents, the acid catalyst, the aldehyde and the PVAL are made into a slurry or suspended or dispersed or dissolved in the organic solvent and the mixture is heated under reflux. If appropriate the aldehyde can also be metered in during the course of the reaction. During the reaction the polyvinyl alcohols insoluble in the organic solvent go into solution as the acetalation proceeds. After the acetalation reaction has ended the reaction product is precipitated by adding nonpolar solvents, such as, for example, pentane, hexane, heptane inter alia, to the reaction solution or by pouring the reaction solution onto ice-cold water or an ice-cold water-alcohol mixture, filtered off from the liquid phase with suction, washed with water adjusted to a weakly alkaline pH (pH 9 to 12) and dried. Alternatively the product can also be isolated by distilling off the solvent.

The polyvinyl acetals according to the invention are suitable both in the pure form and as an admixture with suitable organic plasticizers, for the preparation of films by thermoplastic shaping. Suitable plasticizers are in principle all plasticizers that can be used for the commercially available polyvinyl acetals, preferably for example, triethylene glycol di(n-heptanoate), and also adipic acid esters, phthalic acid esters, phosphoric acid esters inter alia.

The polyvinyl acetals according to the invention, in particular the mixed acetals, can, moreover, also be admixed with commercially available polyvinyl acetals, in particular polyvinyl butyral, preferably in a weight ratio of 99:1 to 1:99, in particular 95:5 to 5:95, and particularly preferentially 80:20 to 20:80. The mixtures prepared in this manner can also be processed to films, with co-use of plasticizers where appropriate.

The polyvinyl acetals according to the invention can also be cross-linked by various methods. Thus cross-linkages, can be achieved, for example, by the use of reactive polyfunctional compounds, such as, for example, isocyanates, acid chlorides and the like, or also by free radical-initiated cross-linkages, such as, for example, by photochemical or thermal initiation in the presence of free radical-forming agents and monomers polymerizable by free radicals.

Because of these properties leading to cross-linkages, the polyvinyl acetals according to the invention are also suitable as binders, for example, in solvent-based coating compositions in the case of water-insoluble polyvinyl acetals, or in water-based coating compositions in the case of the water-soluble polyvinyl acetals.

Because of the good adhesion properties of the polyvinyl acetals according to the invention towards diverse materials, preferably towards metals and glass, these polyvinyl acetals can advantageously be used as coating compositions, it being possible to apply such coatings either from polymer solutions or from the polymer melt. In contrast, commercially available polyvinyl butyrals can in general not be used from the melt without the addition of organic plasticizers.

Because of the good adhesion properties towards glass, in particular in the case of the polyvinyl acetals according to the invention which have a relatively high content of vinyl alcohol units, the polyvinyl acetal films according to the invention are particularly suitable for the production of laminated glass. When processing the polyvinyl acetals according to the invention, or their admixtures with commercially available polyvinyl butyrals, to produce films, the film properties, such as, for example, the film tear strength, the film extensibility, the blocking characteristics, and the like, can be influenced within wide limits. Because of their surprisingly good adhesion properties the polyvinyl acetals according to the invention are, in particular, also valuable coating compositions for metals, preferably for iron and steel.

The invention therefore further relates to the use of the polyvinyl acetals according to the invention, inter alia in all fields of application mentioned in the present description.

Thus, the polyvinyl acetals according to the invention be advantageously also be used in numerous fields of application in which known polyvinyl acetals are customarily used, preferably, for example, as binders for pigments, for the preparation of printing inks, hot-melt adhesives and solvent-containing or solvent-free adhesives, and also as binders for ceramic powders in the preparation of high grade ceramic electronic components. They are also suitable as binders and/or a coating agent component for inorganic and/or organic fibers, filaments, non-wovens, textile shut-like structures, cellulose materials, paper, and the like.

Depending on the application, the polyvinyl acetals according to the invention can be mixed with customary additives, such as, for example, pigments, dyes, plasticizers, solvents, adhesion regulators and stabilizers. As already mentioned above, a co-use of plasticizers in the thermoplastic shaping of polyvinyl acetals according to the invention is in principle not necessary, although it can be advantageous in some cases. In the latter case, however, the amounts of plasticizer used for example with polyvinyl acetals according to the invention are significantly lower than those in the case of the known polyvinyl acetals, in particular polyvinyl butyrals.

The phenolic compounds used with the known polyvinyl butyrals, such as, for example, 2,4-di-tert.-butyl-p-cresol, phosphites such as tris-nonyl-phenyl phosphite, inter alia, can be used as stabilizers.

The addition of the said additives can in many cases take place either before or during or after the preparation of the polyvinyl acetals according to the invention.

The invention is explained in more detail by means of the following examples.

EXAMPLES 1 TO 9

Example 1

A 10% aqueous PVAL solution (70 g of PVAL solid) is prepared under a nitrogen atmosphere and with heating in a reaction vessel fitted with stirrer. The PVAL component used is a PVAL which as a 4% solution, has a viscosity of 28 mPa.s (measured according to Höppler: DIN 53 015) and which has a degree of hydrolysis of 99%. 100 ml of a 20% hydrochloric acid solution and 0.14 g of 2,6-di-tert.-butyl-4-methylphenol are added to the PVAL solution. 83.7 g of 3,6-dioxaheptanal are added dropwise at 50° C. over a period of 30 min. The reaction solution is held at 48° C. for 5 hours. A highly viscous solution forms. This solution is then neutralized (pH 7.5) with KOH solution and the salt formed is removed by dialysis against distilled water. The reaction product is then isolated by freeze-drying.

The following analytical and technical application characteristics of the polyvinyl acetal obtained are determined: the content of vinyl alcohol units in the polyvinyl acetal is 17.9% by weight, relative to the polyvinyl acetal, or 31.8 mol %, relative to the vinyl alcohol units of the starting PVAL. The polyvinyl acetal has an alkali titer (ml n/100 HCl/100 g of polymer) of 28 and a turbidity point of the 1% aqueous solution of 49° C. As well as in water, it is also soluble in 1:1 aqueous mixtures of the alcohols ethanol, methanol and isopropanol and in a 1:1 aqueous mixture of acetone. The polymer has a glass transition temperature of 37° C. A polyvinyl butyral comparable in respect of the degree of acetalation and molecular weight of the PVAL used has, in contrast, a glass transition temperature of 75° C.

The polyvinyl acetal can be processed to a water-soluble pressed film at 165° C. and 80 bars without the addition of plasticizers. The following specific film properties were determined after prior conditioning. (23° C., 50% relative atmospheric humidity):

Strength: 16.4 N/mm$^2$; Elongation: 300%.

The polyvinyl acetal exhibits good adhesion to glass and metal.

Example 2

The reaction is carried out analogously to Example 1. Addition of 62.6 g of 3,6-dioxaheptanal.

The following analytical and technical application characteristics of the polyvinyl acetal obtained are determined: the content of vinyl alcohol units in the polyvinyl acetal is 22.8% by weight, relative to the polyvinyl acetal, or 38.7 mol %, relative to the vinyl alcohol units of the starting PVAL. The polyvinyl acetal has an alkali titer (ml n/100 HCl/100 g of polymer) of 30 and a turbidity point of the 1% aqueous solution of 52° C. As well as in water it is also soluble in 1:1 aqueous mixtures of the alcohols ethanol, methanol and isopropanol and in a 1:1 aqueous mixture of acetone. The polymer has a glass transition temperature of 45° C. The polyvinyl acetal can be processed to a water-soluble pressed film at 165° C. and 80 bars without the addition of plasticizers.

The following specific film properties were determined after prior conditioning. (23° C., 50% relative atmosheric humidity):

Strength: 19.4 N/mm$^2$: Elongation: 275%.

The polyvinyl acetal exhibits very good adhesion to glass and metal.

Example 3

The reaction is carried out analogously to Example 1. However the isolation of the polyvinyl acetal was carried out by adding the neutralized reaction solution dropwise to ice-cold tetrahydrofuran. The product was filtered off with suction using a Büchner funnel and dried. The product characteristics substantially corresponded to those listed in Example 1.

Example 4

As in Example 1, 20 g of PVAL are suspended in 380 ml of ethanol and 200 ml of water are added. 24 g of 3,6-dioxaheptanal and 0.4 g of p-toluenesulfonic acid are added. The batch is stirred at 55° C. for 24 hours. The solid is then filtered off and the filtrate neutralized (pH 8.0). After addition of a precipitating agent (heptane) the reaction product is isolated from the filtrate. A white powder with a content of vinyl alcohol units of 31.9% by weight is obtained. The solution characteristics substantially correspond to the solution characteristics of the polyvinyl acetal in Example 1. The 1% aqueous solution has a turbidity point of 61.5° C. The polyvinyl acetal can be processed to a water soluble pressed film at 61.5° C. and 80 bars without addition of plasticizers.

Example 5

Changes to Example 1:

A PVAL which as a 4% solution has of a viscosity 4 mPa.s (measured according to Höppler: DIN 53 015) and a degree of hydrolysis of 98% is used as PVAL component. After addition of the HCl (110 ml, 20% by weight), 25.54 g of 3,6-dioxaheptanal are added at 55° C. and the mixture is stirred for 3 hours. The solution is cooled to 7° C. and 33 g of butyraldehyde are added. The batch becomes highly viscous and a finely divided white powder precipitates out. The suspension is stirred for 3 hours at 15° C. The powder is then filtered off with suction, washed neutral with water and then stabilized in KOH solution (pH 11.5). The powder is filtered off with suction again and dried. 106 g of the mixed polyvinyl acetal are obtained. The following analytical and technical application characteristics were determined:

The content of vinyl alcohol units in the polyvinyl acetal is 13.7% by weight. The glass transition temperature is 54° C. A comparable polyvinyl butyral has a glass transition temperature of 72° C.

Example 6

The reaction is carried out analogously to Example 5. However, 54.3 g of 3,6-dioxaheptanal and 12.9 g of butyraldehyde are used. A water-soluble mixed polyvinyl acetal is formed which is worked up analogously to Example 1. Yield 112 g. The following analytical and technical application characteristics were determined:

The content of vinyl alcohol units in the polyvinyl acetal is 17.4% by weight. The polyvinyl acetal has an alkali titer of 40 and a turbidity point of 24° C. The glass transition temperature is 44° C. In contrast to a polyvinyl butyral with a comparable degree of acetalation, the product exhibits a clear reduction in the glass transition temperature. In comparison with Example 1, the water uptake of the polymer powder is clearly lower.

Example 7

The reaction is carried out analogously to Example 1. 101.6 g of 3,6,9-trioxadecanal are used for acetalation. 140 g of a white powder are obtained. The following analytical and technical application characteristics were determined:

The content of vinyl alcohol units in the polyvinyl acetal is 23.7% by weight or 45.1 mol-%, relative to the vinyl alcohol units in the starting PVAL. In contrast to the polyvinyl acetals with 3,6-dioxaheptanal, the product exhibits an even clearer internal plasticizing. The glass transition temperature is 15° C. In comparison with Example 1, the polyvinyl acetal has a glass transition temperature which is lower by 22 2° C., coupled with a higher content of vinyl alcohol units. The turbidity point is 68° C. The polyvinyl acetal can be processed to a water-soluble pressed film at 165° C. and 80 bars without addition of plasticizers. The following specific film properties were determined after prior conditioning (23° C., 50% relative atmospheric humidity):

Strength: 6.4 N/mm$^2$; Elongation: 570%.

Because of its high content of vinyl alcohol units the polyvinyl acetal exhibits very good adhesion to glass and metal.

Example 8

The reaction is carried out analogously to Example 1. 90.3 g of 3,6,9-trioxadecanal are used for acetalation. 142 g of a white powder are obtained. The following analytical and technical application characteristics were determined:

The content of vinyl alcohol units in the polyvinyl acetal is 26.2% by weight or 48.3 mol-%, relative to the vinyl alcohol units in the starting PVAL. The glass transition temperature is 20° C. The turbidity point is 70° C. The polyvinyl acetal can be processed to a water-soluble pressed film at 165° C. and 80 bars without addition of plasticizers. The following specific film properties were determined after prior conditioning (23° C., 50% relative atmospheric humidity):

Strength: 7.0 N/mm$^2$; Elongation: 530%.

Because of its high content of vinyl alcohol units the polyvinyl acetal exhibits very good adhesion to glass and metal.

Example 9 (Comparative Example)

The reaction is carried out analogously to Example 1. Reaction temperature 40° C. 53.4 g of methoxyacetaldehyde are used for acetalation. 93 g of a white powder are obtained. The following analytical and technical application characteristics were determined:

The content of vinyl alcohol units in the polyvinyl acetal is 29.3% by weight or 40.4 mol-%, relative to the vinyl alcohol units in the starting PVAL. In comparison with the polyvinyl acetals with 3,6-dioxaheptanal and 3,6,9-trioxadecanal, the polyvinyl acetal has a high glass transition temperature of 79° C. The turbidity point is 45° C. The low degree of internal plasticizing is also clear from the analytical data of the pressed films (low elongation!) (preparation: 165° C., 80 bars; conditioning: 23° C., 50% relative atmospheric humidity). Ultimate tensile strength: 60.7 N/mm$^2$; Elongation: 15%.

We claim:

1. An acetal of polyvinyl alcohol, which contains acetal groups which are derived from aldehydes of the formula (I)

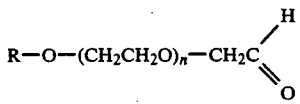

in which n is an integer and R a linear or branched alkyl radical having 1 to 20 carbon atoms or a cycloalkyl radical or an aryl radical.

2. The acetal of polyvinyl alcohol as claimed in claim 1, wherein n in formula I is an integer of from 1 to 3.

3. The acetal of polyvinyl alcohol as claimed in claim 1,
wherein R in formula (I) is an alkyl radical having 1 to 4 carbon atoms.

4. An acetal of polyvinyl alcohol as claimed in claim 1,
wherein not more than 85 mol-% of the hydroxyl groups originally present are acetalated.

5. The acetal of polyvinyl alcohol as claimed in claim 1, which contains other acetal groups in addition to those derived from aldehydes of the formula (I).

6. The acetal of polyvinyl alcohol as claimed in claim 5, which contains aliphatic acetal groups having 1 to 6 carbon atoms.

7. A film prepared from an acetal of polyvinyl alcohol as claimed in claim 1.

8. An adhesive or coating agent containing an acetal of polyvinyl alcohol as claimed in claim 1.

9. A shaped article prepared from an acetal of polyvinyl alcohol as claimed in claim 1.

* * * * *